Feb. 27, 1945.  L. F. MAUS  2,370,560

STALK FEEDING ATTACHMENT

Filed April 27, 1942   2 Sheets-Sheet 1

Inventor
Lester F. Maus
By John E. Shuler Jr.
Attorney

Feb. 27, 1945.  L. F. MAUS  2,370,560

STALK FEEDING ATTACHMENT

Filed April 27, 1942  2 Sheets-Sheet 2

Inventor
Lester F. Maus
By John E. Stryker, Jr.
Attorney

Patented Feb. 27, 1945

2,370,560

UNITED STATES PATENT OFFICE 2,370,560

STALK FEEDING ATTACHMENT

Lester F. Maus, Minnesota City, Minn.

Application April 27, 1942, Serial No. 440,601

6 Claims. (Cl. 130—33)

This invention relates to automatic feeding mechanism for pairs of rolls between which the stalks of plants, such as corn stalks, must be fed, either for the purpose of separating the ears of corn from the stalks, or for shredding the stalks, or for other purposes. Hand feeding of such rolls is slow and frequently results in injury to the operator and the mechanical feeding devices heretofore provided have not been entirely satisfactory because they are subject to clogging of the material at the receiving side of the bight of the rolls. Such clogging frequently necessitates delays in the operation while the machine is shut down and cleared of the obstructing material and sometimes results in breakage or damage to the machine. Stoppages are usually caused by such stalks as are presented crosswise or obliquely, rather than longitudinally, relative to the direction of feed.

The principal object of the present invention is to substantially eliminate such clogging by providing novel feeding mechanism adapted to deliver all stalks between the rolls irrespective of their positions as they approach the rolls.

My invention also includes certain novel details of construction which will be more fully pointed out in the following specification and claims.

Referring to the accompanying drawings.

Figure 1:
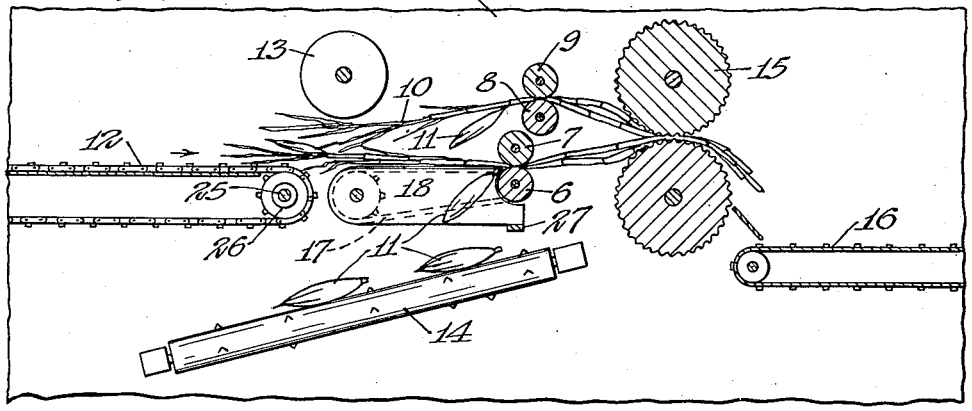
Figure 1 is a diagrammatic, part side elevation and part longitudinal section through my improved feeding attachment and the adjacent portions of a corn husking and shredding machine of common type.
Figure 2:
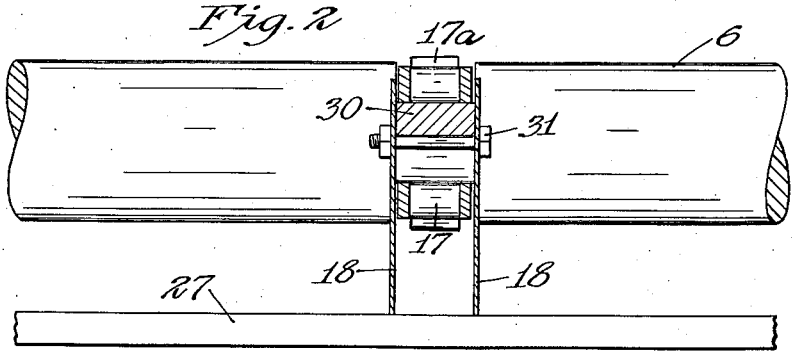
Fig. 2 is an enlarged cross section through one of my feeding chains and the shields therefor, taken on the line 2—2 of Fig. 3.

My invention is illustrated in connection with a machine of the type having a lower pair of snapping rolls 6 and 7 and upper snapping rolls 8 and 9, all extending horizontally across the machine and arranged to be power-driven at more than a hundred revolutions per minute. The corn stalks 10 (Fig. 1) are drawn forcibly between these pairs of rolls while the ears of corn 11, being too large to pass between the rolls, are torn from the stalks and fall freely to the bottom of the machine. For automatically feeding the stalks to the snapping rolls a slat conveyor 12 is provided upon which the stalks are deposited and a spreading device 13 is mounted above the delivery end of this conveyor for distributing the stalks laterally of the machine. As the ears 11 fall from the stalks they may be caught on a series of husking rolls 14 suitably arranged and operated as in ordinary machines of this class. Other conventional parts of the machine may include a pair of rollers 15 adapted to receive the stalks from the snapping rolls and a conveyor 16 disposed to receive the stalks from the rollers 15 and to feed them to the shredding knives (not shown) which reduce them to shreds.

Figure 4:
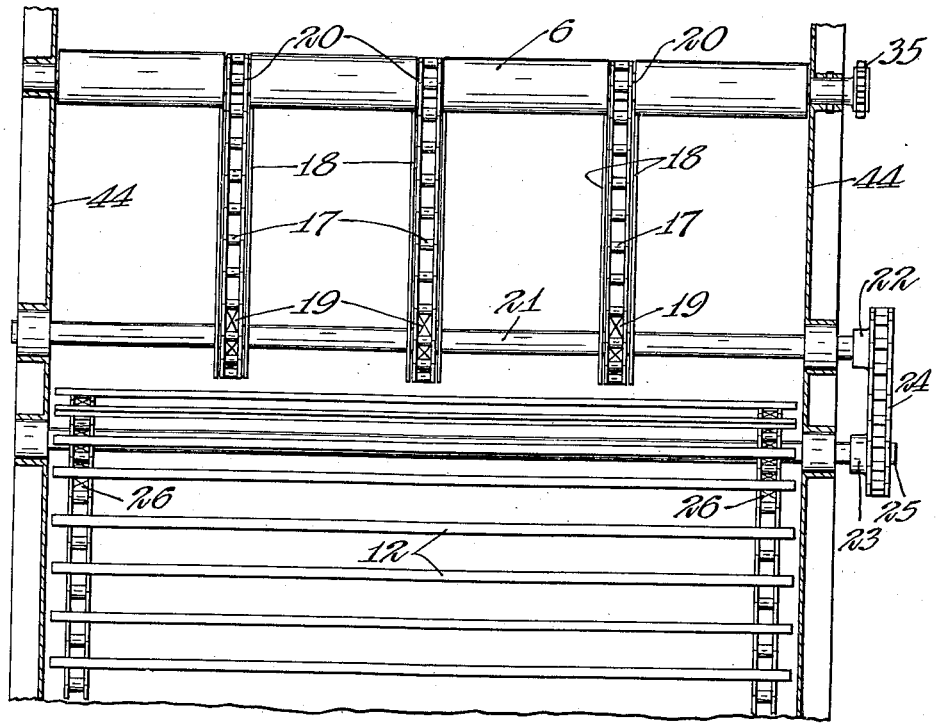
Fig. 4 is a plan view of my attachment, together with the lower snapping roll and a portion of the feed conveyor.

My improved feeding mechanism comprises a plurality of laterally spaced chains 17 severally mounted between pairs of shield plates 18 and arranged with their upper reaches extending into the bight of the lower snapping rolls 6 and 7. Each chain 17 is trained on a sprocket wheel 19 and in an annular groove 20 formed in the lower snapping roll 6. The several sprocket wheels 19 are fixed on a supporting shaft 21 which is parallel to the roll 6 and power-driven in the same direction as that roll and at a speed which causes the chains to travel somewhat slower than the peripheral speed of the rolls 6 and 7. This causes the chains to slip in the grooves 20. As shown in Fig. 4, the shaft 21 may be driven by connecting it to the slat conveyor 12 through sprocket wheels 22 and 23 and a chain 24, the sprocket wheel 23 being fixed on a shaft 25 which carries sprocket wheels 26 upon which the chains of the conveyor 12 are trained. Ordinarily, the conveyor 12 is power-driven through a friction clutch so that if the feeding is obstructed at the snapping rolls the chains 17, as well as the conveyor 12, will stop, while the snapping rolls continue to operate.

Figure 5:
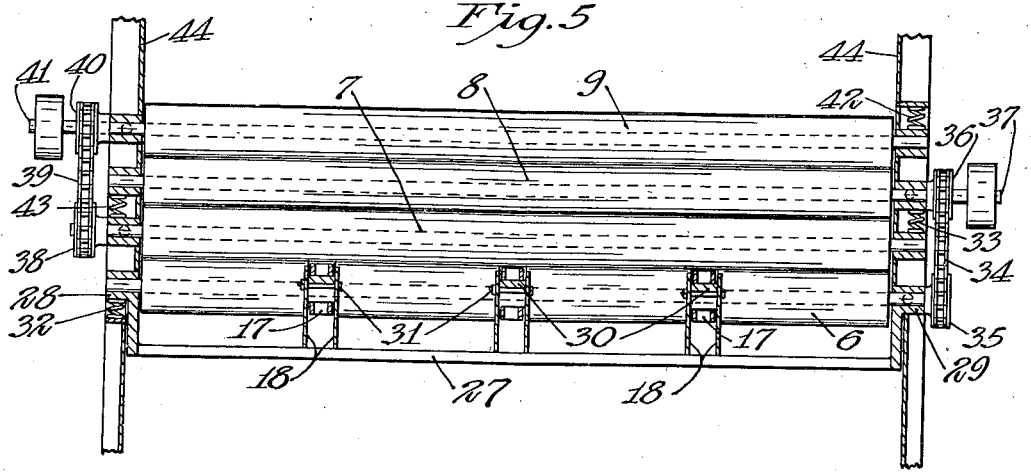
Fig. 5 is a fragmentary section through the machine taken approximately on the line 5—5 of Fig. 3.

One of the shield plates 18 is disposed vertically and closely adjacent to each lateral face of each of the chains 17. These shields are perforated to revolubly receive the shaft 21 which supports them at their rear ends and their front ends are supported on a bar 27. As best shown in Fig. 5, this bar extends longitudinally beneath the roll 6 and is suspended from bearings 28 and 29 for the roll. To slidably support the upper reach of each of the chains 17 a bar 30 is mounted between the shield plates 18 associated therewith and each bar 30 is fastened to a pair of bolts 31 adapted to engage the plates in perforations therein. The bars 30 are so spaced from the upper edges of the shields 18 as to cause the upper reaches of the chains 17 to project slightly above the upper edges of the shields. Each link of the chain is formed with a rounded projection 17a which increases the friction with the stalks or other material supported on the chains. The forward ends of the shields 18 are shaped to fit close to the roll 6 and these shields are otherwise disposed to prevent corn stalks, husks, grass, weeds or other obstructing material from entering either between the chains and sprockets 19 or between the roll 6 and chains.

As shown in Fig. 5, provision is made for allowing relative movement of the rolls 6 and 7 sufficient to permit the passage of the corn stalks between these rolls, springs being arranged to press the snapping rolls of each pair together in accordance with the usual construction. For this purpose a spring 32 may be arranged to urge the bearing 28 for the roll 6 toward the roll 7 while the opposite bearing 29 for the roll 6 is fixed on the frame and a spring 33 is arranged to urge the adjoining end of the roll 7 toward the roll 6. Power for actuating the roll 6 may be transmitted through a chain 34 to a sprocket wheel 35 fixed on the shaft supporting the roll 6 and a driving sprocket 36 for the chain 34 may be mounted on a power-driven shaft 37 which also supports and drives the snapping roll 8 of the upper pair. The upper roll 7 of the lower pair may be driven through a sprocket wheel 38, a chain 39 and a sprocket wheel 40, the latter being fixed on a power-driven axial shaft 51 which drives the top snapping roll 9 directly. To resiliently press the roll 9 toward the roll 8, a spring 42 is suitably disposed to engage one end bearing of roll 9 and the opposite end of the roll 8 is urged toward the roll 9 by a spring 43.

Figure 3:
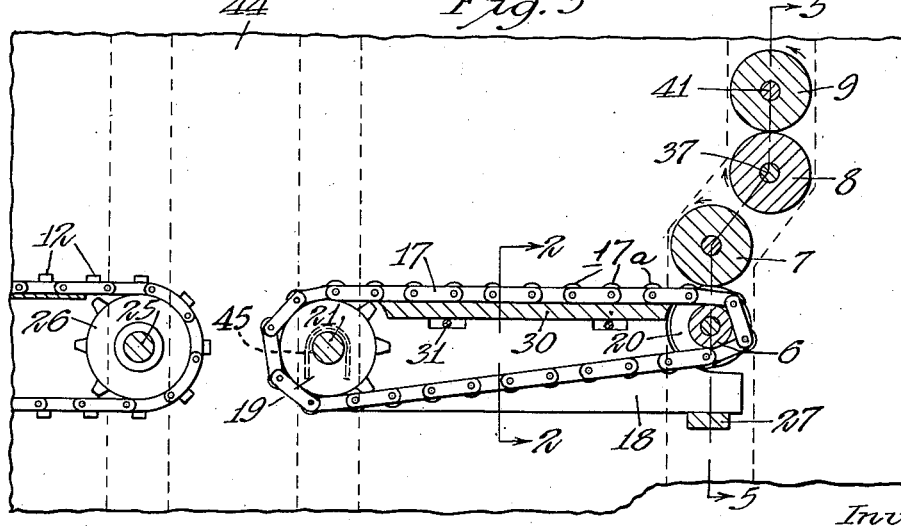
Fig. 3 is a longitudinal section through one of the units of my attachment and showing the snapping rolls and conveyor shafts in cross section.

Through pulleys on the ends of the shafts 37 and 41 and the sprocket and chain connections hereinbefore described, the several snapping rolls are positively driven in the direction indicated by arrows in Fig. 3. These rolls are preferably formed with fluted, knurled or otherwise roughened peripheries to increase friction and eliminate slipping relative to the material which is gripped between them. Parallel, side casing members 44 confine the stalks or other material to a predetermined path of movement through the machine and it will be evident that the several rolls 6, 7, 8 and 9 extend across this path. The upper pair, rolls 8 and 9, are offset forward and in overlapping relation to the lower pair so that the stalks cannot pass between the rolls 7 and 8. To prevent the winding of weeds, leaves and other vegetation on the shaft 21, shields 45 (Fig. 3) may be provided along this shaft. Each of these shields comprises a sheet metal cap, of inverted U shape in cross section, extending between the side members 44 and shields 18 and also between the several shields 18 to which they may be fastened.

In operation, the corn stalks, usually in the form of bundles are placed, butt ends to the front, on the slat conveyor 12 which is continuously operated to feed them toward the snapping rolls. As each bundle approaches the snapping rolls the band confining the stalks is severed either manually or by suitable power-driven mechanism (not shown) and the stalks are spread laterally by the device 13 so that when they reach the snapping rolls a number of them are gripped in the bight of each pair of snapping rolls simultaneously and are rapidly pulled through the machine. Since the ears 11 cannot pass between the rolls they are forcibly torn free from the stalks and fall between the feed chains 17 to the husking rolls 14 or to a conveyor or suitable receptacle similarly located. The upper rolls 8 and 9 increase the capacity of the machine by separating ears of corn from the stalks which are fed at an elevation above the rolls 7.

Some of the stalks are variously disposed obliquely or approximately crosswise of the direction of feed, or even parallel to the snapping rolls and they are seldom either straight or uniform in size or shape. With my improved feeding attachment, such stalks as are presented at right angles or obliquely across the chains 17 are forced down upon the upper reaches of these chains by the overlying stalks and are thereby carried into the bight of the lower snapping rolls, whereupon these rolls draw them forward, thus clearing the passage for the succeeding stalks. For best results I have found that the speed of movement of the stalks through the machine should be progressively increased by driving the snapping rolls at a slightly higher peripheral speed than the sprocket wheels 19 and the latter at a somewhat higher peripheral speed than the sprocket wheels 26 of the slat conveyor 12. This causes some sliding movement of the chains 17 relative to the roll 6 in the grooves 20.

It will be evident that the feed chains 17 may be extended beyond the snapping roll 6 by providing sprocket wheels to the right of the roll 6, as seen in Fig. 3, upon which the chains 17 are trained, but it is important to extend the upper reaches of these chains through the bight of the rolls in grooves or recesses in the rolls. The several chains 17 are spaced apart a sufficient distance (preferably 8 to 10 inches) to allow the detached ears to fall freely out of the path of the stalks and these chains extend back from the rolls 6 and 7 a distance somewhat greater than the length of the ears 11 to further insure against stoppage of the ears in the path of the stalks. Severe tests of my device have demonstrated that it operates to prevent clogging even when the stalks are extremely dry and slippery or otherwise in such condition that they could not be fed to the snapping rolls by ordinary feeding mechanism.

Having described my invention, what I claim as new and desire to protect by Letters Patent is:

1. In mechanism of the class described, the combination of a pair of power-driven rolls disposed substantially horizontally, one above the other, to receive and grip stalks between their adjacent peripheries, the lower of said rolls having an annular groove in its periphery and the outer periphery of the upper of said rolls being uninterrupted above said groove, a sprocket wheel mounted in spaced relation to said rolls and in a common plane with said groove, an endless chain trained on said sprocket and in said groove, means supporting the upper reach of said chain so that it is exposed continuously to support stalks adjacent to said rolls and means for actuating said chain to feed stalks between said rolls.

2. In mechanism of the class described, the combination of a pair of power-driven rolls disposed one above the other to receive and grip stalks between their adjacent peripheries and to separate ears of corn from the stalks, a plurality of endless chains extending in spaced parallel relation to each other, means supporting the upper reaches of said chains to extend substantially horizontally, transversely of said rolls and between the same, the lower of said rolls being formed with annular grooves having smooth bearing surfaces to slidably engage and guide said chains respectively, shields enclosing opposite sides of said chains respectively, said shields being formed to leave the upper reaches of the chains projecting to afford continuous support for the stalks adjacent to said rolls, the space between the chains being unobstructed to permit the separate ears of corn to fall between the chains, and means for actuating said chains to direct stalks between said rolls.

3. In mechanism of the class described, the combination with power-driven rolls disposed substantially horizontally, one above the other, to receive and grip stalks between their adjacent peripheries, the lower of said rolls being formed with an annular groove to receive a chain of an endless chain extending transversely of said rolls and having its upper reach extending into said groove to support stalks extending crosswise of the chain, and said chain being operable at a lower speed than the rolls, shields enclosing opposite sides of said chain and means for actuating said chain at a lower speed than the rolls to direct stalks between said rolls.

4. In mechanism of the class described, the combination with a pair of power-driven rolls disposed substantially horizontally, one above the other, to receive and grip stalks between their adjacent peripheries, of an endless chain operable in a substantially vertical plane and extending into the bight of said rolls, the lower of said rolls being formed with an annular groove to receive and guide said chain and the periphery of said upper roll being uninterrupted above said groove vertically disposed shields enclosing opposite sides of said chain, means supporting the upper reach of said chain to cause the same to project continuously above the upper edges of said shields, projections on the chain having inclined surfaces for engagement with the stalks and means for actuating said chain to direct stalks between said rolls.

5. In mechanism of the class described, the combination with a pair of power-driven, corn snapping rolls disposed to receive and grip corn stalks between their adjacent peripheries, of a plurality of endless chains extending in substantially vertical planes and in spaced, parallel relation to each other, transversely of said rolls and between the same, shields enclosing the lateral faces of each of said chains, means supporting the upper reaches of the chains to cause them to project above the shields for engagement with the stalks, the spaces between the chains being unobstructed to permit the ears of corns to pass downward from the bight of the rolls, means for actuating the upper reaches of the chains toward the rolls, means for imparting vibrating movement to said shields and chains and power-driven means for feeding stalks, with ears of corn attached, to said chains and rolls.

6. In mechanism of the class described, the combination with a pair of power-driven, corn snapping rolls disposed to receive and grip corn stalks between their adjacent peripheries, of a plurality of endless chains extending in substantially vertical planes and in spaced, parallel relation to each other, transversely of said rolls and between the same, said chains being slidable in grooves formed in the lower of said rolls, shields enclosing the lateral faces of each of said chains, the upper reaches of the chains projecting above the shields for engagement with the stalks and the spaces between chains being unobstructed to permit the ears of corn to fall from the bight of the rolls, means for actuating said chains at a lower speed than the rolls to direct stalks between said rolls and power-driven means for feeding stalks, with ears of corn attached, to said chains and rolls.

LESTER F. MAUS.